UNITED STATES PATENT OFFICE.

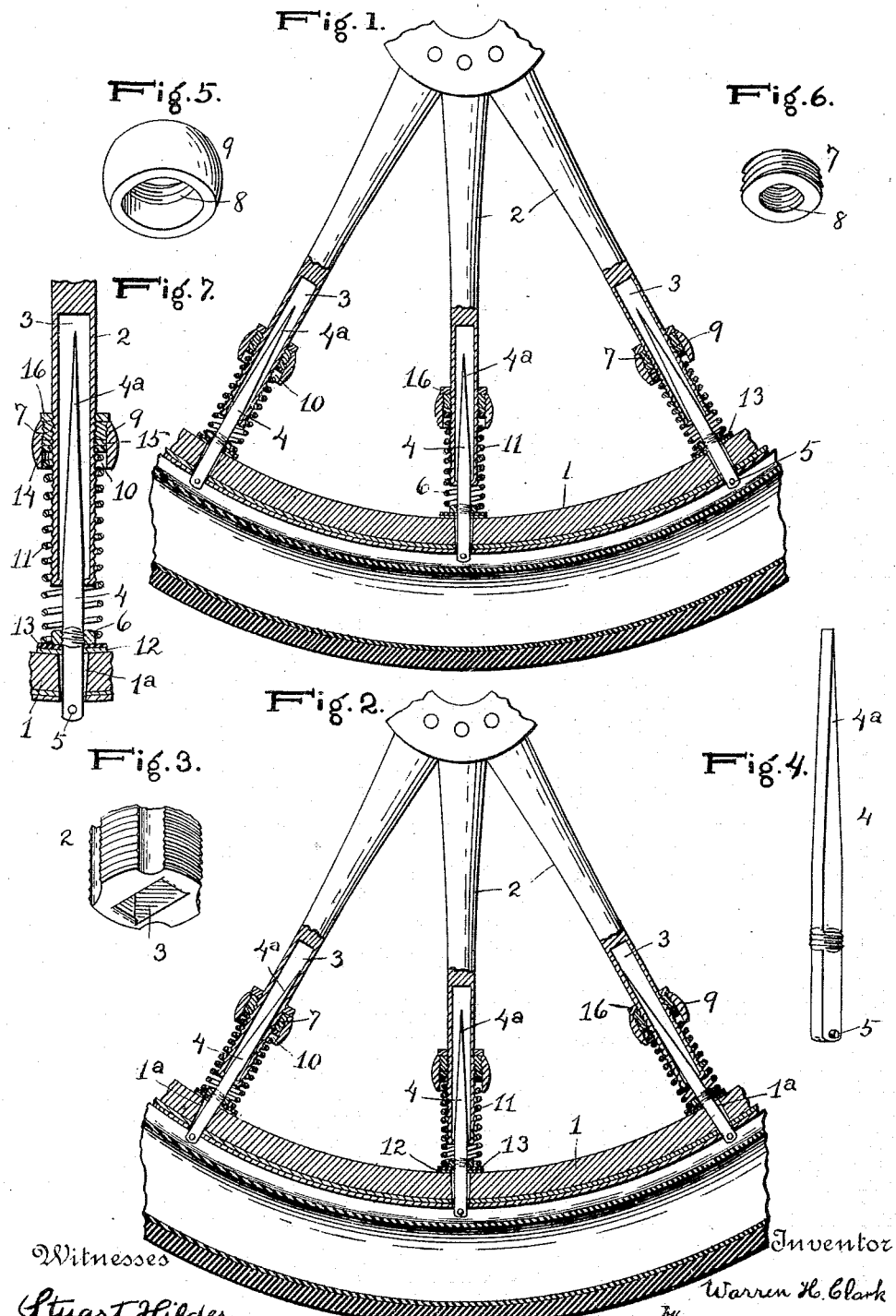

WARREN H. CLARK, OF WEST BURLINGTON, NEW YORK.

SPRING-WHEEL.

995,116.

Specification of Letters Patent. Patented June 13, 1911.

Application filed September 19, 1910. Serial No. 582,779.

*To all whom it may concern:*

Be it known that I, WARREN H. CLARK, a citizen of the United States, resident of West Burlington, in the county of Otsego and State of New York, have made a certain new and useful Invention in Spring-Wheels; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a longitudinal central section of a portion of a wheel having my invention applied thereto. Fig. 2 is a similar view showing the positions assumed by the plungers when the parts are under strain. Fig. 3 is a detail perspective view of the end portion of the spoke. Fig. 4 is a similar view of one of the plungers. Fig. 5 is a similar view of the sleeve. Fig. 6 is a similar view of the collar. Fig. 7 is a detail sectional view on a larger scale of one of the spokes having my invention applied thereto.

The invention has relation to spring wheels for vehicles, having particular reference to a spring connection between the spokes and the felly, and it consists in the novel construction and combinations of parts as hereinafter set forth.

In the accompanying drawings, illustrating the invention, the numeral 1 designates the felly of the wheel and 2, 2 the spokes, each of which is provided with a longitudinal recess seat 3, of oblong form in cross-section, at its outer end, in which neatly and slidably fits a plunger 4, having a cross-bolt connection at its outer end with the felly as shown at 5, a nut 6 having threaded engagement with the stem of said plunger and bearing against the wooden portion of the felly and acting in connection with said cross-bolt connection to secure the plunger in position, while allowing pivotal movement of the plungers.

A collar 7 has threaded engagement with each spoke as shown at 8, a sleeve 9 having threaded engagement with said collar and being of sufficient length to provide above the collar a recess seat 10 in the bore of the sleeve for the inner end of a coil spring 11, surrounding the outer end portions of the spoke and of the plunger and bearing at its outer end against the wooden portion of the felly of the wheel, a metal washer 12, overlaid by a thin rubber washer 13, being interposed between the wooden felly and the end of the spring.

The inner end of the coiled spring fitting in the recess seat of the sleeve has bearing against a rubber washer 14, under which is a metal washer 15, resting upon the collar 7.

The collar 7 may be adjusted longitudinally of the spoke, with which it has threaded engagement, as before stated, to adjust the tension of the coiled spring, and in order to lock said collar against inward movement a nut 16 has threaded engagement with the spoke and bearing at its end against the collar, said nut having also bearing against the sleeve surrounding the collar for locking purposes, if desired.

The normal position of the plungers 4 is shown in Fig. 1 of the drawings, and when the parts are put under strain these plungers, which have tapered inner end portions $4^a$, will turn upon the cross-bolt connections 5 with the felly and move laterally in opposite directions in their oblong seats in the spokes to assume the position shown in Fig. 2 of the drawings, this movement being allowed for by the tapered apertures $1^a$ of the felly, through which the plungers pass.

The spokes are preferably threaded as shown in Fig. 3 of the drawings, for engagement with the collars 7.

The pressure of the spring will in practice serve to prevent outward movement of the collar upon the thread of the spoke.

The felly of the wheel is made up of thin metal and wood of elastic character, and my spring connection between said felly and the spokes of the wheel is of simple character easily and cheaply manufactured.

The springs being of larger internal diameter than the spokes over which they fit, and bearing at their ends against the rubber washers, their movement will be noiseless.

Having thus described my invention, what I claim as new and desire to secure by Letters Patent is:—

A spring wheel, having a felly, spokes provided with end recesses, plungers engaging said recesses and having at their outer ends pivotal connections with said felly, collars upon said spokes, coiled springs surrounding the outer ends of said spokes and the outer ends of said plungers and bearing at their outer ends against said felly and at their inner ends against said collars, said plungers being capable of longitudinal movement in said recesses and of pivotal movement in opposite directions upon their felly connections when the felly is pressed inward at its lower portion by the load.

In testimony whereof I affix my signature, in presence of two witnesses.

WARREN H. CLARK.

Witnesses:
T. BOOTMAN,
A. C. TALBOT.

Copies of this patent may be obtained for five cents each, by addressing the "Commissioner of Patents, Washington, D. C."